(12) United States Patent
Lozhkin et al.

(10) Patent No.: US 12,028,097 B2
(45) Date of Patent: Jul. 2, 2024

(54) RADIO COMMUNICATION DEVICE AND DISTORTION COMPENSATION METHOD

(71) Applicant: FUJITSU LIMITED, Kawasaki (JP)

(72) Inventors: Alexander Nikolaevich Lozhkin, Kawasaki (JP); Tomoya Ota, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 328 days.

(21) Appl. No.: 17/670,115

(22) Filed: Feb. 11, 2022

(65) Prior Publication Data

US 2022/0385316 A1    Dec. 1, 2022

(30) Foreign Application Priority Data

May 26, 2021    (JP) ................................ 2021-088179

(51) Int. Cl.
| | |
|---|---|
| *H04B 1/04* | (2006.01) |
| *H01Q 3/34* | (2006.01) |
| *H04B 7/01* | (2006.01) |
| *H04B 7/04* | (2017.01) |

(Continued)

(52) U.S. Cl.
CPC ............. *H04B 1/0475* (2013.01); *H01Q 3/36* (2013.01); *H04B 2001/0425* (2013.01)

(58) Field of Classification Search
None
See application file for complete search history.

(56) References Cited

U.S. PATENT DOCUMENTS

| | | | | |
|---|---|---|---|---|
| 7,333,561 | B2* | 2/2008 | Pinckley | H03F 1/3294 |
| | | | | 455/114.3 |
| 7,496,384 | B2* | 2/2009 | Seto | H04B 7/086 |
| | | | | 455/562.1 |
| 9,525,205 | B2* | 12/2016 | Oh | H01Q 3/34 |

(Continued)

FOREIGN PATENT DOCUMENTS

| | | |
|---|---|---|
| JP | 2018-033109 A | 3/2018 |
| JP | 2019-154024 A | 9/2019 |

OTHER PUBLICATIONS

Ding, L., et al., "Concurrent Dual-band Digital Predistortion", 2012 IEEE/MTT-S International Microwave Symposium Digest (2012).

*Primary Examiner* — Pablo N Tran
(74) *Attorney, Agent, or Firm* — ArentFox Schiff LLP

(57) ABSTRACT

A radio communication device includes: a plurality of antenna elements; a phase shifter that applies weights for each of the antenna elements respectively to first-band data and second-band data of different frequency bands to form beams corresponding to the first-band data and the second-band data; a power amplifier that is arranged for each of the antenna elements; and a processor configured to compensate for non-linear distortion. The processor executes a process including calculating, using a first distortion compensation coefficient, a distortion compensation signal that compensates for in-band non-linear distortion of the first-band data and the second-band data, and calculating, using a second distortion compensation coefficient, an out-of-band compensation signal that compensates for out-of-band non-linear distortion of the first-band data and the second-band data, and the power amplifier amplifies a signal obtained by synthesizing the distortion compensation signal and the out-of-band compensation signal.

7 Claims, 6 Drawing Sheets

(51) Int. Cl.
*H04B 7/06* (2006.01)
*H01Q 3/36* (2006.01)

(56) References Cited

U.S. PATENT DOCUMENTS

| | | | | |
|---|---|---|---|---|
| 10,659,124 | B2 * | 5/2020 | Ohshima | H04B 7/0617 |
| 2023/0318640 | A1 * | 10/2023 | Shimura | H04B 1/0475 |
| | | | | 455/114.3 |
| 2024/0056111 | A1 * | 2/2024 | Mochizuki | H04B 1/04 |

* cited by examiner

RADIO COMMUNICATION DEVICE AND DISTORTION COMPENSATION METHOD

CROSS-REFERENCE TO RELATED APPLICATION

This application is based upon and claims the benefit of priority of the prior Japanese Patent Application No. 2021-088179, filed on May 26, 2021, the entire contents of which are incorporated herein by reference.

FIELD

The embodiment discussed herein is related to a radio communication device and a distortion compensation method.

BACKGROUND

In general, a radio communication device, such as a base station device, is provided with a power amplifier that amplifies the power of a transmission signal. In a radio communication device, in order to increase the power efficiency, a power amplifier may be caused to run around a saturation region where the output power is saturated with respect to the input power. When the power amplifier is caused to run near the saturation region, non-linear distortion that occurs in the power amplifier increases. In order to manage the non-liner distortion and meet standards, such as ACLR (Adjacent Channel Leakage Ratio) or SEM (Spectrum Emission Mask), the radio communication device may execute distortion compensation of compensating for non-linear distortion.

Specifically, one of distortion compensation methods is digital pre-distortion (DPD). When distortion compensation is performed by DPD, a transmission signal before being input to a power amplifier is previously multiplied by a distortion compensation coefficient having a property inverse to that of non-linear distortion that occurs in the power amplifier. Such DPD processing improves linearity of the output of the power amplifier and manages non-linear distortion. In DPD, the output signal of the power amplifier is fed back and a distortion compensation coefficient is calculated or adaptively updated using a look up table (LUT) or a series.

Some radio communication devices include an array antenna and execute beamforming of forming a beam that is oriented to a desired direction. In order to amplify each of transmission signals that diverge to a plurality of antenna elements, such a radio communication device includes a plurality of power amplifiers corresponding to the antenna elements. Collectively compensating for distortion that occurs in the power amplifiers by DPD has been considered. In other words, DPD processing of multiplication by a distortion compensation coefficient that suppresses non-linear distortion in the directions of beams is executed on the transmission signals before diverging to the antenna elements.

Patent Literature 1: Japanese Laid-open Patent Publication No. 2018-33109
Patent Literature 2: Japanese Laid-open Patent Publication No. 2019-154024
Non-Patent Literature 1: Lei Ding et al., "Concurrent dual-band digital predistortion", 2012 IEEE/MTT-S International Microwave Symposium Digest, June, 2012

There is however a problem that DPD described above does not sufficiently compensate for non-linear distortion that occurs in a power amplifier that amplifies a plurality of signals of different frequency bands. In other words, a recent radio communication device may transmit and receive signals of a plurality of operators recently and, when the frequency bands of the signals of the operators are different from one another, the power amplifier of the radio communication device may amplify the signals of the different frequency bands.

In such a case, executing the DPD processing independently on each of the signals of the different frequency bands makes it possible to suppress the in-band non-linear distortion to some extent; however, because the signals of the different frequency bands are amplified by the same power amplifier, it is not easy to send the output signals of the power amplifier as feedbacks and independently update the distortion compensation coefficient on each of the signals of the respective frequency bands. Furthermore, because the signals of the different frequency bands are amplified by the same power amplifier, out-of-band non-linear distortion occurs in out of each signal band and the out-of-band non-linear distortion may deteriorate the signal quality.

It is possible to solve these problems by using a filter, such as a bandpass filter, when the frequency bands of the respective signals are separate sufficiently in comparison with bandwidths of the signals. Specifically, for example, the case where, as illustrated in FIG. 6(a), a first signal 11 has a center frequency of 26 GHz, a second signal 12 has a center frequency of 28 GHz, and these center frequencies are separate, for example, five times as much as the signal bandwidths will be described. When the frequency bands of the first signal 11 and the second signal 12 are separate sufficiently as described above, it is possible to, with a filter, separate signal components of each of the frequency band from an output signal of a power amplifier that amplifies these signals. It is thus possible to independently update a distortion compensation coefficient of each of the first signal 11 and the second signal 12.

When the frequency bands of the first signal 11 and the second signal are separate sufficiently, out-of-band non-linear distortion 13 occurs at frequencies that are sufficiently separate from the signal bands. It is thus possible to, for example, with a bandpass filter having a passband 15, remove out-of-band non-linear distortion from the output signal of the power amplifier.

On the other hand, for example, the case where, as illustrated in FIG. 6(b), a first signal 21 has a center frequency of 27.6 GHz, a second signal 22 has a center frequency of 28.0 GHz, and these center frequencies are separate only as much as the signal bandwidths are will be considered. When the frequency bands of the first signal 21 and the second signal 22 are close, it is difficult to, with a filter, separate signal components of each of the frequency bands from an output signal of a power amplifier that amplifies the signals. Thus, it is difficult to independently update a distortion compensation coefficient of each of the first signal 21 and the second signal 22 and accurate distortion compensation is not executed.

When the frequency bands of the first signal 21 and the second signal 22 are close to each other, out-of-band non-linear distortion 23 may occur at frequencies overlapping the signal bands. It is thus difficult to, with a filter, remove out-of-band non-linear distortion from an output signal of the power amplifier.

As described above, particularly when the frequency bands of a plurality of signals are close, it is difficult to perform effective DPD processing on each of the signals and a sufficient compensation is not made for non-linear distortion that occurs in a power amplifier that amplifies these signals.

SUMMARY

According to an aspect of an embodiment, a radio communication device includes: a plurality of antenna elements; a phase shifter that applies weights for each of the antenna elements respectively to first-band data and second-band data of different frequency bands to form beams corresponding to the first-band data and the second-band data; a power amplifier that is arranged for each of the antenna elements and that amplifies the first-band data and the second-band data; and a processor configured to compensate for non-linear distortion that occurs in the first-band data and the second-band data in the power amplifier. The processor executes a process including calculating, using a first distortion compensation coefficient, a distortion compensation signal that compensates for in-band non-linear distortion of the first-band data and the second-band data from the first-band data and the second-band data, and calculating, using a second distortion compensation coefficient, an out-of-band compensation signal that compensates for out-of-band non-linear distortion of the first-band data and the second-band data from the first-band data and the second-band data, and the power amplifier amplifies a signal obtained by synthesizing the distortion compensation signal and the out-of-band compensation signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

An embodiment of a radio communication device and a distortion compensation method disclosed by the present application will be described in detail below with reference to the accompanying drawings. Note that the embodiment does not limit the disclosure.

Figure 1:
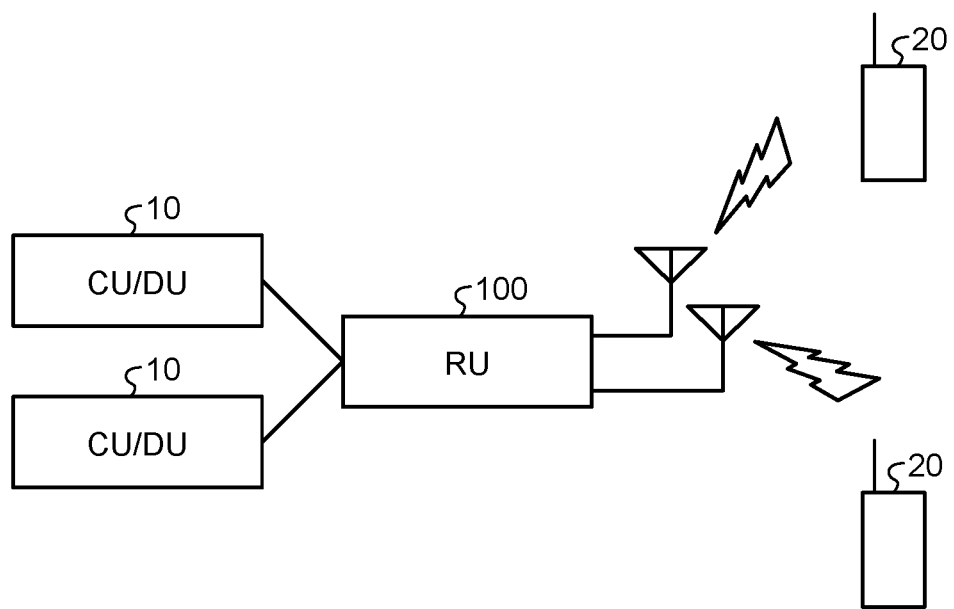
FIG. 1 is a diagram illustrating an example of a configuration of a radio communication system.

FIG. 1 is a diagram illustrating an example of a configuration of a radio communication system according to the embodiment. As illustrated in FIG. 1, the radio communication system includes a central unit/distributed unit (CU/DU) 10, a radio unit (RU) 100, and a user equipment (UE) 20.

The CU/DU 10 is connected to a core network (not illustrated in FIG. 1) and executes baseband processing on data to be transmitted to the UE 20 or data that is received from the UE 20. Specifically, the two CU/DUs 10 are connected to core networks of respective operators, execute baseband processing on sets of data of the respective operators of different frequency bands, and transmit the processed sets of data to the RU 100. For example, one of the CU/DUs 10 executes the baseband processing on first-band data and the other CU/DU 10 executes the baseband processing on second-band data of a frequency band different from that of the first-band data.

The first-band data and the second-band data may be sets of data of the different operators that are transmitted from the different CU/DUs 10, respectively, or may be sets of data of the same operator that are transmitted from the single CU/DU 10. The CU/DU 10 may be an integration of a CU and a DU and consist of one device or may include a CU and a DU that are provided independently and consist of a plurality of devices. The CU/DU 10 and the RU 100 function as a base station device of the radio communication system.

The RU 100 executes radio frequency (RF) processing on data to be transmitted to the UE 20 or data that is received from the UE 20. Specifically, the RU 100 receives the first-band data and the second-band data of the different frequency bands from the CU/DUs 10, executes RF processing on the first-band data and the second-band data, and transmits the processed data to the UE 20.

The RU 100 includes an array antenna consisting of a plurality of antenna elements, forms beams corresponding to the first-band data and the second-band data, respectively, and executes radio communication with the UE 20. The RU 100 executes distortion compensation of compensating for non-linear distortion in a power amplifier that amplifies the first-band data and the second-band data. In other words, the RU 100 executes distortion compensation of compensating for in-band non-linear distortion of the first-band data and the second-band data and executes distortion compensation of compensating for out-of-band non-linear distortion of the first-band data and the second-band data. The configuration of the RU 100 will be described in detail below.

The UE 20 is a terminal device that executes radio communication with the RU 100. In other words, the UE 20 receives a radio signal from the RU 100 and transmits a radio signal to the RU 100.

Figure 2:
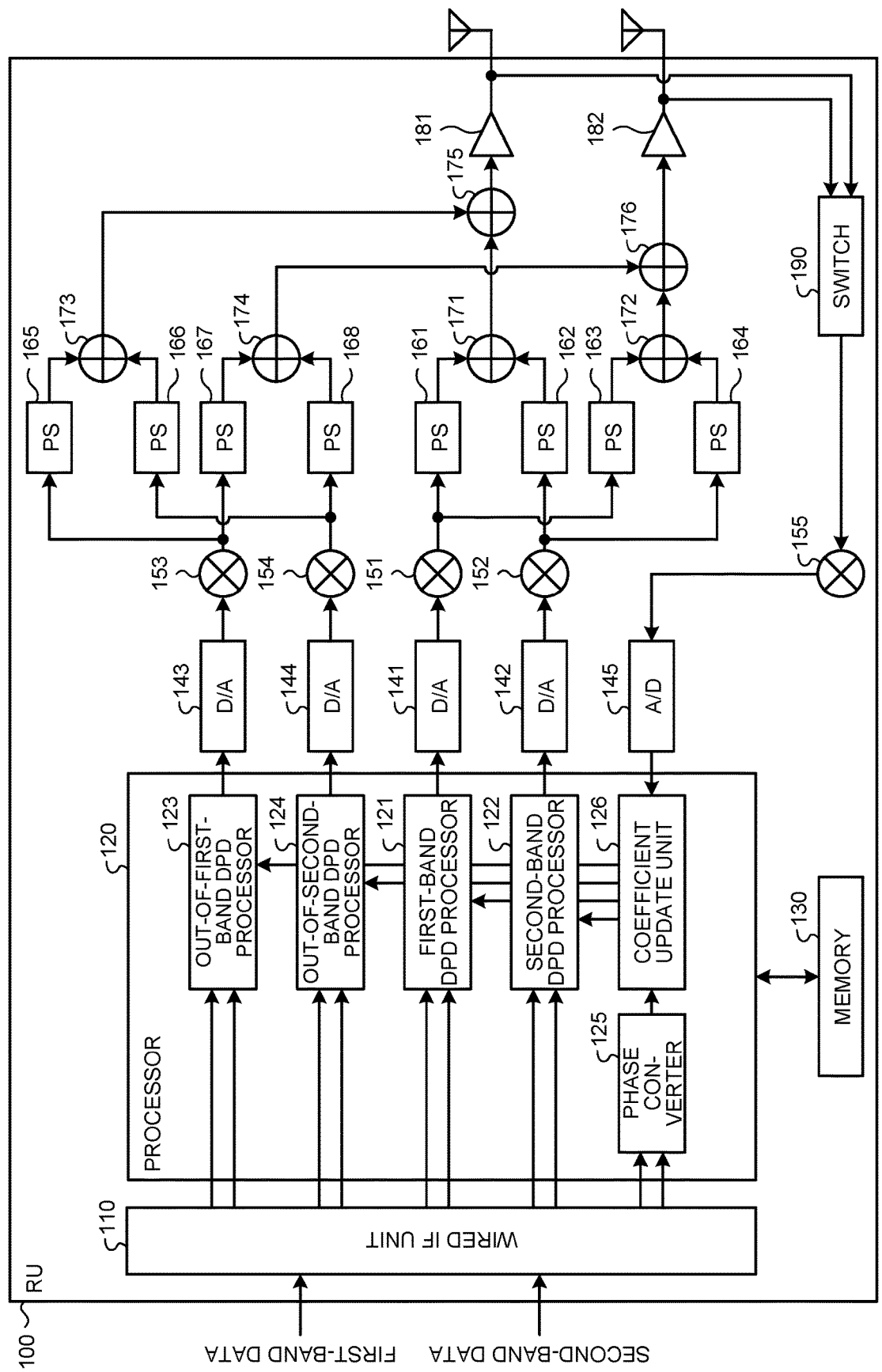
FIG. 2 is a block diagram illustrating a configuration of a RU according to an embodiment.

FIG. 2 is a block diagram illustrating a configuration of the RU 100 according to the embodiment. The RU 100 illustrated in FIG. 2 includes a wired interface unit (simply "wired IF unit" below) 110, a processor 120, a memory 130, digital/analog (D/A) converters (simply "D/A" below) 141 to 144, an analog/digital (A/D) converter (simply "A/D" below) 145, up converters 151 to 154, a down converter 155, phase shifters (PS) 161 to 168, synthesizers 171 to 176, power amplifiers 181 and 182, and a switch 190.

The wired IF unit 110 has wired connection with the CU/DUs 10 and receives first-band data and second-band data of different frequency bands from the CU/DUs 10. The wired IF unit 110 outputs the first-band data and the second-band data to the processor 120. The wired IF unit 110 transmits reception signals that are received from the UEs 20 to the CU/DUs 10.

The processor 120 includes, for example, a central processing unit (CPU), a field programmable gate array (FPGA), or a digital signal processor (DSP) and performs multi-control on the entire RU 100. Specifically, the processor 120 includes a first-band DPD processor 121, a second-band DPD processor 122, an out-of-first-band DPD processor 123, an out-of-second-band DPD processor 124, a phase converter 125, and a coefficient update unit 126.

The first-band DPD processor 121 calculates a distortion compensation signal that suppresses in-band non-linear distortion that occurs within the signal band of the first-band data, using the first-band data and the second-band data. Specifically, the first-band DPD processor 121 multiplies the first-band data and the second-band data by a distortion compensation coefficient to calculate a distortion compensation signal for suppressing in-band non-linear distortion that occurs within the signal band of the first-band data in the power amplifiers 181 and 182. The first-band DPD processor 121 calculates a distortion compensation signal $y_{in1}$ according to Equation (1) below from first-band data $x_1(t)$ and second-band data $x_2(t)$ at a discrete time t.

$$y_{in1} = \sum_{k=0}^{K-1}\sum_{n=0}^{N-1}\sum_{i=0}^{k} a_{2k+1,n,i} x_1(t-n)|x_2(t-n)|^{2(k-i)}|x_1(t-n)|^{2i} \quad (1)$$

Note that, in Equation (1), K is a maximal degree of non-linear distortion, N is a memory depth, and $a_{2k+1,n,i}$ is a distortion compensation coefficient of a complex number.

The second-band DPD processor 122 calculates a distortion compensation signal that suppresses in-band non-linear distortion that occurs within the signal band of the second-band data, using the first-band data and the second-band data. Specifically, the second-band DPD processor 122 multiplies the first-band data and the second-band data by the distortion compensation coefficient to calculate a distortion compensation signal for suppressing in-band non-linear distortion that occurs within the signal band of the second-band data in the power amplifiers 181 and 182. The second-band DPD processor 122 calculates a distortion compensation signal $y_{in2}$ according to Equation (2) below from the first-band data $x_1(t)$ and the second-band data $x_2(t)$ at the discrete time t.

$$y_{in2} = \sum_{k=0}^{K-1}\sum_{n=0}^{N-1}\sum_{i=0}^{k} a_{2k+1,n,i} x_2(t-n)|x_1(t-n)|^{2(k-i)}|x_2(t-n)|^{2i} \quad (2)$$

As described above, using the same distortion compensation coefficient $a_{2k+1,n,i}$ the first-band DPD processor 121 and the second-band DPD processor 122 calculate the distortion compensation signals $y_{in1}$ and $y_{in2}$, respectively.

The out-of-first-band DPD processor 123 calculates a distortion compensation signal that suppresses out-of-band non-linear distortion that occurs in out of the signal band of the first-band data ("out-of-band compensation signal" below), using the first-band data and the second-band data. Specifically, the out-of-first-band DPD processor 123 multiplies the first-band data and the second-band data by a distortion compensation coefficient to calculate an out-of-band compensation signal for suppressing out-of-band non-linear distortion that occurs in out of the signal band of the first-band data in the power amplifiers 181 and 182. For example, to reduce out-of-band third order distortion, the out-of-first-band DPD processor 123 calculates an out-of-band compensation signal $y_{out+1}$ according to Equation (3) below from the first-band data $x_1(t)$ and the second-band data $x_2(t)$ at the discrete time t.

$$y_{out1} = \sum_{k=1}^{K-1}\sum_{n=0}^{N-1}\sum_{i=1}^{k} b_{2k+1,n,i} x_1^2(t-n) x_2^*(t-n)|x_1(t-n)|^{2(k-i)}|x_2(t-n)|^{2i} \quad (3)$$

Note that, in Equation (3), K is a degree of non-linear distortion, N is a memory depth, $b_{2k+1,n,i}$ is a distortion compensation coefficient of a complex number, and * denotes a complex conjugate.

The out-of-second-band DPD processor 124 calculates an out-of-band compensation signal that suppresses out-of-band non-linear distortion that occurs in out of the signal band of the second-band data, using the first-band data and the second-band data. Specifically, the out-of-second-band DPD processor 124 multiplies the first-band data and the second-band data by the distortion compensation coefficient to calculate an out-of-band compensation signal for suppressing out-of-band non-linear distortion that occurs in out of the signal band of the second-band data in the power amplifiers 181 and 182. For example, to reduce out-of-band third order distortion, the out-of-second-band DPD processor 124 calculates an out-of-band compensation signal $y_{out+2}$ according to Equation (4) below from the first-band data $x_1(t)$ and the second-band data $x_2(t)$ at the discrete time t.

$$y_{out2} = \sum_{k=1}^{K-1}\sum_{n=0}^{N-1}\sum_{i=1}^{k} b_{2k+1,n,i} x_2^2(t-n) x_1^*(t-n)|x_2(t-n)|^{2(k-i)}|x_1(t-n)|^{2i} \quad (4)$$

As described above, the out-of-first-band DPD processor 123 and the out-of-second-band DPD processor 124 calculate the out-of-band compensation signals $y_{out1}$ and $y_{out2}$, respectively, using the same distortion compensation coefficient $b_{2k+1,n,i}$. The distortion compensation coefficient for calculating an out-of-band compensation signal is referred to as a "out-of-band compensation coefficient" below.

The phase converter 125 converts the phases of the first-band data and the second-band data that serve as a reference signal when the distortion compensation coefficient and the out-of-band compensation coefficient are updated, then synthesizes the first-band data and the second-band data, and outputs a resultant reference signal to the coefficient update unit 126. Specifically, the phase converter 125 applies, to the first-band data and the second-band data, weights corresponding to a power amplifier whose output signal is fed back among the power amplifiers 181 and 182, synthesizes the first-band data and the second-band data with converted phases, and outputs the synthesized data to the coefficient update unit 126. When the output signal of the power amplifier 181 is fed back, the phase converter 125 applies the same weight as that of the PS 161 to the first-band data, applies the same weight as that of the PS 162 to the second-band data, and synthesizes the first-band data and the second-band data with the converted phases. When the output signal of the power amplifier 182 is fed back, the phase converter 125 applies the same weight as that of the PS 163 to the first-band data, applies the same weight as that of the PS 164 to the second-band, and synthesizes the first-band data and the second-band data with the converted phases.

The coefficient update unit 126 updates the distortion compensation coefficient that is used by the first-band DPD processor 121 and the second-band DPD processor 122 and the out-of-band compensation coefficient that is used by the out-of-first-band DPD processor 123 and the out-of-second-band DPD processor 124. Specifically, the coefficient update unit 126 updates a base coefficient using, for example, a least mean square (LMS) algorithm such that the error between the reference signal that is output from the phase converter 125 and the feedback signal that is sent from the switch 190 is small. The coefficient update unit 126 calculates a distortion compensation coefficient and an out-of-band compensation coefficient from the updated base coefficient. The coefficient update unit 126 calculates an error err(t) between a feedback signal ("FB signal" below) $y_m$ that is fed back from a m-th one of M amplifiers (M is an integer equal to or larger than 2) (0<m≤M) and a reference signal obtained by performing phase conversion corresponding to the m-th power amplifier according to Equation (5) below.

$$\text{err}(t) = (x_1(t)e^{j\varphi 1m} + x_2(t)e^{j\varphi 2m}) - y_m \qquad (5)$$

Note that, in Equation (5), j is an imaginary unit, $\varphi_{1m}$ is a weight that is applied to the first-band data that is input to the m-th power amplifier, and $\varphi_{2m}$ is a weight that is applied to the second-band data that is input to the m-th power amplifier. In other words, $(x_1(t)e^{j\varphi 1m} + x_2(t)e^{j\varphi 2m})$ on the right-hand side in Equation (5) is a reference signal obtained by the phase converter 125 by converting the phases of the first-band data and the second-band data and then synthesizing the first-band data and the second-band data.

The coefficient update unit 126 updates the base coefficient $c_{2k+1,n}$ to reduce the error err(t), for example, according to Equation (6) below.

$$c_{2k+1,n}(g+1) = c_{2k+1,n}(g) + \mu \cdot \text{err}(t) \cdot \{x_1(t-n) + x_2(t-n)\}^* \cdot |x_1(t-n) + x_2(t-n)|^{2k} \qquad (6)$$

Note that, in Equation (6), g denotes a generation of the base coefficient and p is a step size. After updating the base coefficient $c_{2k+1,n}$, the coefficient update unit 126 calculates a distortion compensation coefficient $a_{2k+1,n,i}$ and an out-of-band compensation coefficient $b_{2k+1,n,i}$ according to Equations (7) and (8) from the updated base coefficient $c_{2k+1,n,i}$ below.

$$a_{2k+1,n,i} = \binom{k+1}{i+1}\binom{k}{i} \cdot c_{2k+1,n} \qquad (7)$$

$$b_{2k+1,n,i} = \binom{k+1}{i-1}\binom{k}{i} \cdot c_{2k+1,n}, \qquad (8)$$

where $\binom{k}{i} = \frac{k!}{i!(k-i)!}$

The coefficient update unit 126 outputs the updated distortion compensation coefficient to the first-band DPD processor 121 and the second-band DPD processor 122 and outputs the updated out-of-band compensation coefficient to the out-of-first-band DPD processor 123 and the out-of-second-band DPD processor 124.

The memory 130 includes, for example, a random access memory (RAM) or a read only memory (ROM) and stores information that is used for processing performed by the processor 120.

The D/A 141 performs D/A conversion on the distortion compensation signal that is calculated by the first-band DPD processor 121. Similarly, the D/A 142 performs D/A conversion on the distortion compensation signal that is calculated by the second-band DPD processor 122. The D/A 143 performs D/A conversion on the out-of-band compensation signal that is calculated by the out-of-first-band DPD processor 123. Similarly, the D/A 144 performs D/A conversion on the out-of-band compensation signal that is calculated by the out-of-second-band DPD processor 124.

The A/D 145 performs A/D conversion on a FB signal that is fed back from the power amplifier 181 or 182 and outputs digital FB signals to the coefficient update unit 126.

The up converter 151 up-converts the distortion compensation signal, which has been D/A converted by the D/A 141, into a signal of a radio frequency. Similarly, the up converter 152 up-converts the distortion compensation signal, which has been D/A converted by the D/A 142, into a signal of a radio frequency. The up converter 153 up-converts the out-of-band compensation signal, which has been D/A converted by the D/A 143, into a signal of a radio frequency. Similarly, the up converter 154 up-converts the out-of-band compensation signal, which has been D/A converted by the D/A 144, into a signal of a radio frequency.

The down converter 155 down-converts the FB signal that is fed back from the power amplifier 181 or 182 into a signal of a baseband frequency.

The PSs 161 and 163 apply weights to form beams for transmitting the first-band data to a desired direction ("beam forming weights") to the distortion compensation signal that has been up-converted by the up converter 151. The PSs 162 and 164 apply beam forming weights to transmit the second-band data to a desired direction to the distortion compensation signal that has been up-converted by the up-converter 152. The PSs 161 and 162 apply beam forming weights to the distortion compensation signal to be amplified by the power amplifier 181. On the other hand, the PSs 163 and 164 apply beam forming weights to the distortion compensation signal to be amplified by the power amplifier 182.

The PSs 165 and 167 apply, to the out-of-band compensation signal that has been up-converted by the up converter 153, weights that is for suppressing out-of-band non-linear distortion ("out-of-band weights" below) and that corresponds to the direction of beam of the first-band data. The PSs 166 and 168 apply, to the out-of-band compensation signal that has been up-converted by the up converter 154, out-of-band weights that is for suppressing out-of-band non-linear distortion and that corresponds to the direction of beam of the second-band data. For example, when beam forming weights that are applied by the PSs 161 to 164 to the distortion compensation signal are $\varphi_{11}$, $\varphi_{21}$, $\varphi_{12}$ and $\varphi_{22}$, the PS 165 applies an out-of-band weight $(2\varphi_{11} - \varphi_{21})$ for suppressing third order distortion to the out-of-band compensation signal. The PSs 166 to 168 similarly apply out-of-band weights $(2\varphi_{21} - \varphi_{11})$, $(2\varphi_{12} - \varphi_{22})$ and $(2\varphi_{22} - \varphi_{12})$ each for suppressing third order distortion to the out-of-band compensation signal.

The PSs 165 and 166 apply out-of-band weights to the out-of-band compensation signal to be amplified by the power amplifier 181. On the other hand, the PSs 167 and 168 apply out-of-band weights to the out-of-band compensation signal to be amplified by the power amplifier 182.

The synthesizer 171 synthesizes the distortion compensation signals to which the PSs 161 and 162 have applied the beam forming weights. Similarly, the synthesizer 172 synthesizes the distortion compensation signals to which the PSs 163 and 164 have applied the beam forming weights. The synthesizer 173 synthesizes the out-of-band compensation signals to which the PSs 165 and 166 have applied the out-of-band weights. Similarly, the synthesizer 174 synthesizes the out-of-band compensation signals to which the PSs 167 and 168 have applied the out-of-band weights.

The synthesizer 175 synthesizes the distortion compensation signal to be amplified by the power amplifier 181 and the out-of-band compensation signal that is output from the synthesizer 173. Thus, the synthesizer 175 outputs a signal that suppresses non-linear distortion that occurs in-band and out-of-band of the first-band data and the second-band data to the power amplifier 181.

The synthesizer 176 synthesizes the distortion compensation signal to be amplified by the power amplifier 182 and the out-of-band compensation signal that is output from the synthesizer 174. Thus, the synthesizer 176 outputs a signal that suppresses non-linear distortion that occurs in-band and out-of-band of the first-band data and the second-band data to the power amplifier 182.

The power amplifier 181 amplifies the signal that is output from the synthesizer 175 and transmits the amplified signal via an antenna element. The power amplifier 182 amplifies the signal that is output from the synthesizer 176 and transmits the amplified signal via an antenna element. The signals that are output from the power amplifiers 181 and 182 are fed back to the switch 190.

The switch 190 outputs the signals that are output from the power amplifiers 181 and 182 as feedback signals to the down converter 155 while switching between the signals. In other words, the switch 190 outputs the signal that is output from the power amplifier 181 as a FB signal to the down converter 155 and, when a given time has elapsed, outputs the signal that is output from the power amplifier 182 as a FB signal to the down converter 155. Thereafter, when a given time has elapsed, the switch 190 outputs the signal that is output from the power amplifier 181 as a FB signal to the down converter 155 again. The case where the RU 100 includes the two power amplifiers 181 and 182 has been described herein; however, when the RU 100 includes M power amplifiers, the switch 190 outputs signals that are output from the M power amplifiers as FB signals to the down converter 155 while switching between the signals at given intervals.

Figure 3:
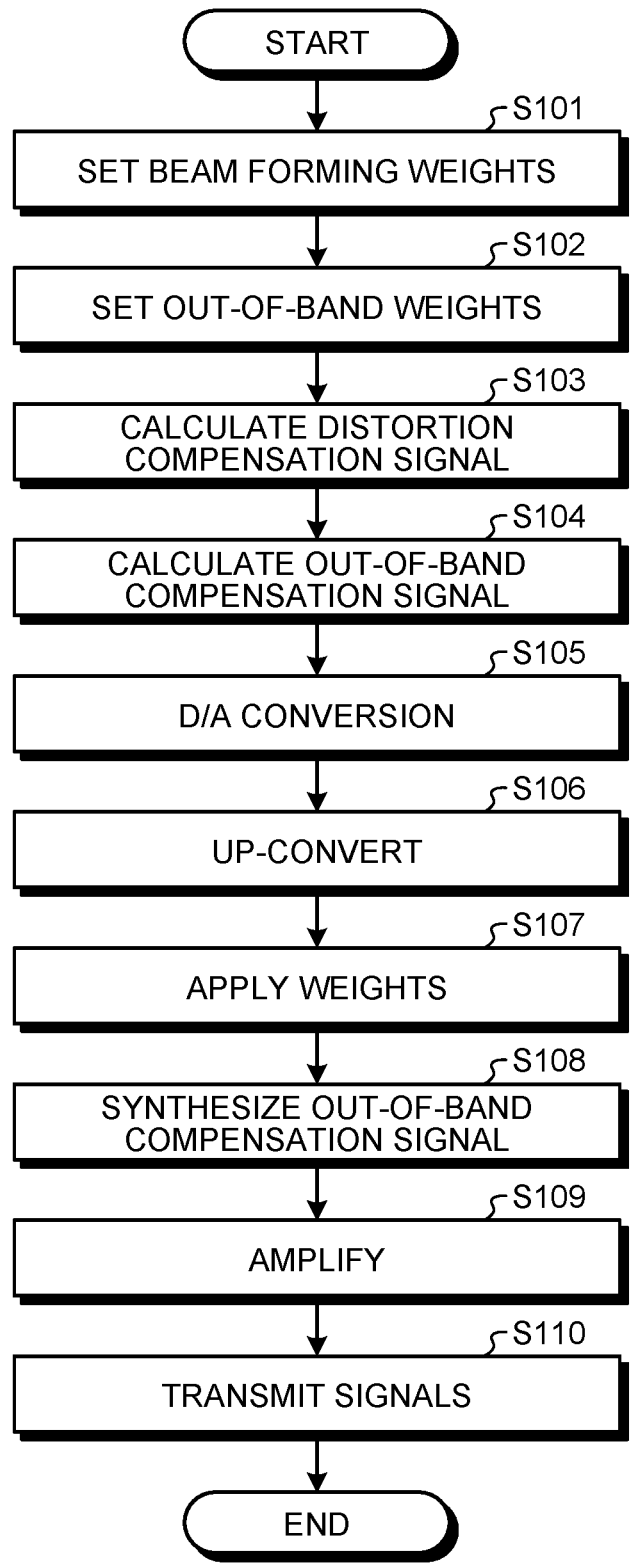
FIG. 3 is a flowchart illustrating a distortion compensation method.

A distortion compensation method performed by the RU 100 configured as described above will be described with reference to the flowchart illustrated in FIG. 3.

When signals are transmitted from the RU 100 by radio, beam forming weights are set in the PSs 161 to 164 (step S101). Specifically, beam forming weights corresponding to beams for transmitting first-band data are set in the PSs 161 and 163 and beam forming weights corresponding to beams for transmitting second-band data are set in the PSs 162 and 164. For example, a beam forming weight $\varphi_{11}$ is set in the PS 161, a beam forming weight $\varphi_{21}$ is set in the PS 162, a beam forming weight $\varphi_{12}$ is set in the PS 163, and a beam forming weight $\varphi_{22}$ is set in the PS 164.

When the beam forming weights are set, out-of-band weights corresponding to the beam forming weights are set in the PSs 165 to 168 (step S102). In other words, out-of-band weights for suppressing out-of-band non-linear distortion of the first-band data are set in the PSs 165 and 167 and out-of-band weights for suppressing out-of-band non-linear distortion of the second-band data are set in the PSs 166 and 168. For example, to reduce out-of-band third order distortion of the first-band data and the second-band data, an out-of-band weight $(2\varphi_{11}-\varphi_{21})$ is set in the PS 165, an out-of-band weight $(2\varphi_{21}-\varphi_{11})$ is set in the PS 166, an out-of-band weight $(2\varphi_{12}-\varphi_{22})$ is set in the PS 167, and an out-of-band weight $(2\varphi_{22}-\varphi_{12})$ is set in the PS 168.

Once the wired IF unit 110 receives the first-band data and the second-band data, the first-band DPD processor 121 and the second-band DPD processor 122 execute DPD processing and calculate distortion compensation signals that suppress in-band non-linear distortion of the first-band data and the second-band data (step S103). In other words, the first-band DPD processor 121 calculates a distortion compensation signal that compensates for in-band non-linear distortion of the first-band data according to Equation (1) above and the second-band DPD processor 122 calculates a distortion compensation signal that compensates for in-band non-linear distortion of the second-band data according to Equation (2) above. The distortion compensation coefficient that is used to calculate distortion compensation signals is updated by the coefficient update unit 126. Updating the distortion compensation coefficient will be described in detail below.

The out-of-first-band DPD processor 123 and the out-of-second-band DPD processor 124 execute DPD processing and calculate out-of-band compensation signals that suppress out-of-band non-linear distortion of the first-band data and the second-band data (step S104). In other words, the out-of-first-band DPD processor 123 calculates an out-of-band compensation signal that compensates for out-of-band third order distortion of the first-band data according to Equation (3) above and the out-of-second-band DPD processor 124 calculates an out-of-band compensation signal that compensates for out-of-band third order distortion of the second-band data according to Equation (4) above. The out-of-band compensation coefficient that is used to calculate out-of-band compensation signals is updated by the coefficient update unit 126. Updating the out-of-band compensation coefficient will be described in detail below.

The D/As 141 to 144 perform D/A conversion on the distortion compensation signals and the out-of-band compensation signals, respectively, (step S105) and the up converters 151 to 154 up-convert the distortion compensation signals and the out-of-band compensation signals, respectively (step S106). The PSs 161 to 168 apply weights to the distortion compensation signals and the out-of-band compensation signals that have been up-converted to radio frequencies (step S107).

Specifically, the PSs 161 and 163 apply beam forming weights $\varphi_{11}$ and $\varphi_{12}$ to the distortion compensation signal that compensates for in-band non-linear distortion of the first-band data and the PSs 162 and 164 apply beam forming weights $\varphi_{21}$ and $\varphi_{22}$ to the distortion compensation signal that compensates for in-band non-linear distortion of the second-band data. The PSs 165 and 167 apply out-of-band weights $(2\varphi_{11}-\varphi_{21})$ and $(2\varphi_{12}-\varphi_{22})$ to the out-of-band compensation signal that compensates for out-of-band third order distortion of the first-band data and the PSs 166 and 168 apply out-of-band weights $(2\varphi_{21}-\varphi_{11})$ and $(2\varphi_{22}-\varphi_{12})$ to the out-of-band compensation signal that compensates for out-of-band third order distortion of the second-band data.

As for the distortion compensation signals and the out-of-band compensation signals to which the beam forming weights or the out-of-band weights are applied are synthesized by the synthesizers 171 to 174, signals to be amplified by the same power amplifier 181 or 182 are synthesized by the synthesizers 171 to 174. In other words, the distortion compensation signal to be amplified by the power amplifier 181 and the out-of-band compensation signal are synthesized by the synthesizers 171 and 173, respectively, and the distortion compensation signal to be amplified by the power amplifier 182 and the out-of-band compensation signal are synthesized by the synthesizers 172 and 174, respectively.

Distortion compensation signals to be amplified by the power amplifiers 181 and 182 and the respective corresponding out-of-band compensations signals are synthesized (step S108). In other words, the synthesizer 175 synthesizes the distortion compensation signal to be amplified by the power amplifier 181 and the out-of-band compensation signal that is output from the synthesizer 173 and the synthesizer 176 synthesizes the distortion compensation signal to be amplified by the power amplifier 182 and the out-of-band compensation signal that is output from the synthesizer 174.

Accordingly, signals that suppress in-band non-linear distortion of the first-band data and the second-band data and out-of-band third order distortion are input to the power amplifiers 181 and 182. These signals are amplified by the power amplifiers 181 and 182 (step S109). At that time, in the power amplifiers 181 and 182, in-band non-linear distortion of the first-band data and the second-band data occur and out-of-band non-linear distortion occur because the signals of different frequency bands are amplified. In the embodiment, because the signals each obtained by synthesizing the band compensation signal and the distortion compensation signal are input to the power amplifiers 181 and 182, out-of-band non-linear distortion that occurs in the power amplifiers 181 and 182 is reduced. In other words, it is possible to compensate for non-linear distortion that occurs in the power amplifiers 181 and 182 that amplify a plurality of signals of different frequency bands.

The signals that are amplified by the power amplifiers 181 and 182 are transmitted from the corresponding antenna elements, respectively (step S110). The beam forming weights are applied to the signals that are transmitted from the respective antenna elements and thus the first-band data and the second-band data are transmitted in beams that are formed in desired directions, respectively.

Figure 4:
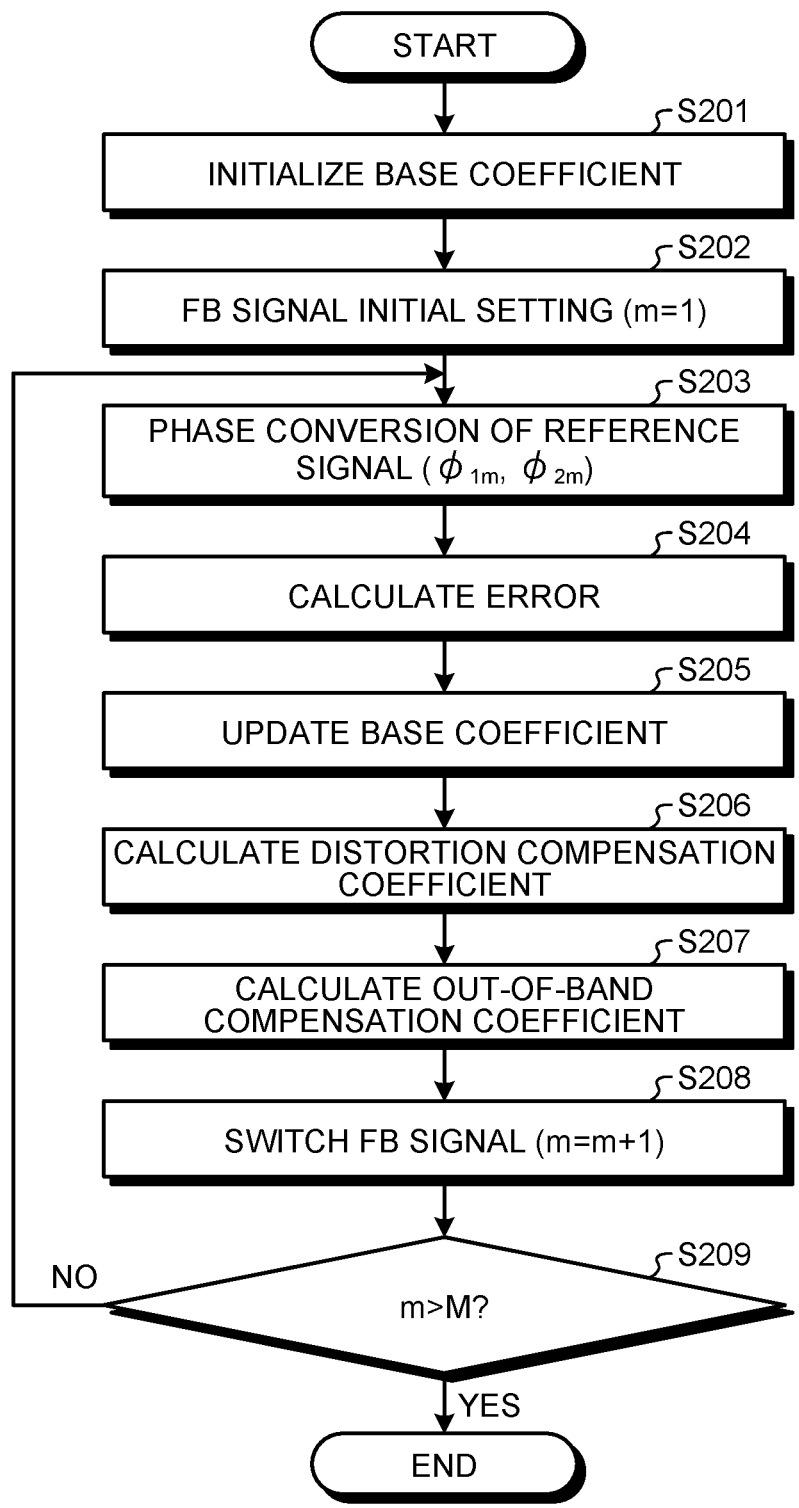
FIG. 4 is a flowchart illustrating a coefficient updating method.

A coefficient updating method performed by the RU 100 according to the embodiment will be described with reference to the flowchart illustrated in FIG. 4. In the coefficient updating method described below, the distortion compensation coefficient that is used by the first-band DPD processor 121 and the second-band DPD processor 122 and the out-of-band compensation coefficient that is used by the out-of-first-band DPD processor 123 and the out-of-second-band DPD processor 124 are updated.

First of all, the coefficient update unit 126 initializes a base coefficient on which calculation of distortion compensation coefficients and out-of-band compensation coefficients are based (step S201). Specifically, the base coefficient $c_{2k+1,n}$ presented in Equation (6) above is initialized to 0 with respect to all k (0≤k<K) and n (0≤n<N). The switch 190 then makes an initial setting on FB signals that are fed back (step S202). In other words, a setting is made such that a signal that is output from an m-th (m=1) one of the M (M=2 herein) power amplifiers 181 and 182 is output as an FB signal to the down converter 155. Accordingly, signals obtained by applying the beam forming weights $\varphi_{1m}$ and $\varphi_{2m}$ to the first-band data and the second-band data in the PSs 161 to 164 are fed back serving as FB signals from the switch 190. Down conversion and A/D conversion are performed on the FB signals and the converted FB signals are input to the coefficient update unit 126.

On the other hand, the phase converter 125 performs phase conversion on the first-band data and the second-band data serving as a reference signal (step S203). In other words, a weight equivalent to the beam forming weight $\varphi_{1m}$ is applied to the first-band data, a weight equivalent to the beam forming weight $\varphi_{2m}$ is applied to the second-band data, and the first-band data and the second-band data are synthesized. A reference signal obtained by the synthesis is input to the coefficient update unit 126.

The coefficient update unit 126 then calculates an error between a FB signal and the reference signal (step S204). In other words, the coefficient update unit 126 performs an arithmetic operation of Equation (5) above. The error that is calculated by Equation (5) is 0 when there is no non-linear distortion in the power amplifiers 181 and 182. Thus, the coefficient update unit 126 uses, for example, an LMS algorithm and updates the base coefficient $c_{2k+1,n}$ to reduce the error (step S205). In other words, as in Equation (6) above, a base coefficient $c_{2k+1,n}$ (g+1) of the next generation is calculated with respect to all k (0≤k<K) and n (0≤n<N) from the current base coefficient $c_{2k+1,n}$ (g).

After the base coefficient $c_{2k+1,n}$ is updated, the coefficient update unit 126 calculates a distortion compensation coefficient $a_{2k+1,n,i}$ based on the base coefficient $c_{2k+1,n}$ (step S206). The coefficient update unit 126 calculates an out-of-band compensation coefficient based on the base coefficient $c_{2k+1,n}$ (step S207). In other words, according to Equations (7) and (8) above, a distortion compensation coefficient $a_{2k+1,n,i}$ and an out-of-band compensation coefficient $b_{2k+1,n,i}$ are calculated from the base coefficient $c_{2k+1,n,i}$ on each of k and n.

After updating the base coefficient $c_{2k+1,n}$ and calculating the distortion compensation coefficient $a_{2k+1,n,i}$ and the out-of-band compensation coefficient $b_{2k+1,n,i}$ are repeated for a given time, the switch 190 switches the FB signal (step S208). In other words, switching is performed such that the signal that is output from the m-th (m=m+1) one of the M (M=2 herein) power amplifiers 181 and 182 is output as an FB signal to the down converter 155. Here, it is determined whether switching has been performed on the signals that are output from all the M power amplifiers 181 and 182 and m exceeds M (step S209). When switching has not been performed on the m-th power amplifier and m is equal to or smaller than M (NO at step S209), processing is repeated from step S203 using the FB signal from the m-th power amplifier. On the other hand, when switching has been performed on the signals that are output from all the M power amplifiers 181 and 182 and m exceeds M (YES at step S209), updating the coefficient ends. When m exceeds M (YES at step S209), the processing may be repeated from step S202 at which m is initialized to 1 again.

As described above, because the base coefficient is updated such that the error between the reference signal and the FB signal is reduced and the distortion compensation coefficients and the out-of-band compensation coefficients are calculated from the base coefficient, it is possible to calculate distortion compensation coefficients and out-of-band compensation coefficients that suppress in-band and out-of-band non-linear distortion that occurs in each power amplifier.

As described above, according to the embodiment, the distortion compensation signal that compensates for in-band non-linear distortion of the first-band data and the second-band data of the different frequency bands and the out-of-band compensation signal that compensates for out-of-band non-linear distortion of the first-band data and the second-band data are synthesized. The synthesized signal is then amplified by the power amplifier that is arranged in each of the antenna elements and the amplified signal is transmitted. This makes it possible to efficiently suppress out-of-band non-linear distortion regardless of the frequency bands of the first-band data and the second-band data and compensate for non-linear distortion that occurs in the power amplifiers that amplify the signals of the different frequency bands.

Figure 5:
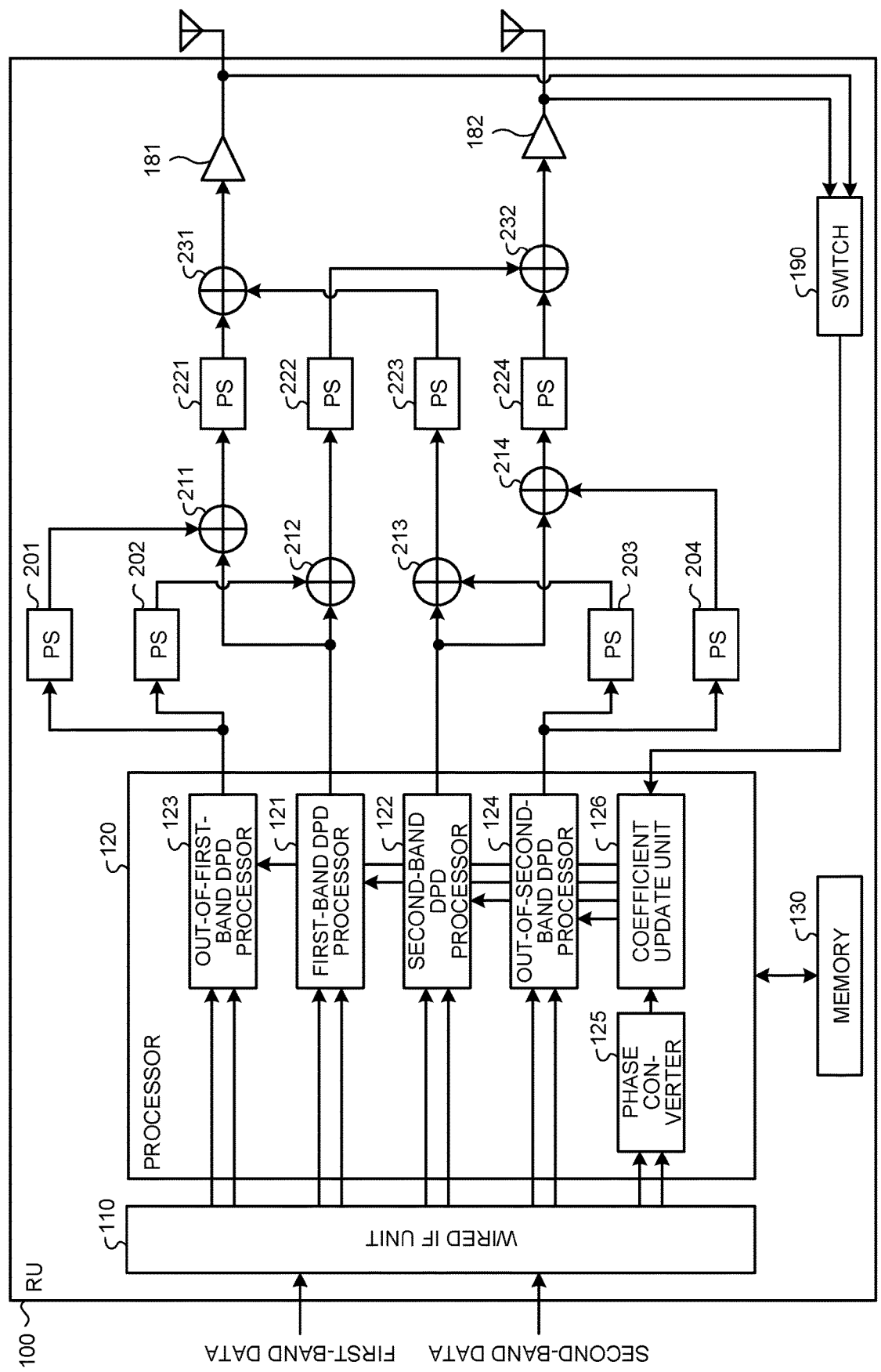
FIG. 5 is a block diagram illustrating a modification of the RU.
Figure 6A:
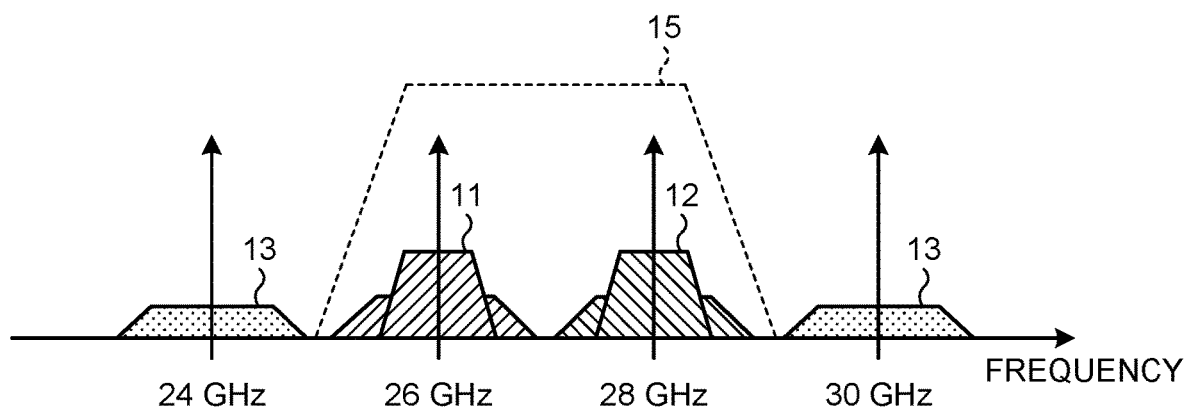
FIGS. 6A and 6B are diagrams illustrating specific examples of frequency assignment.
Figure 6B:
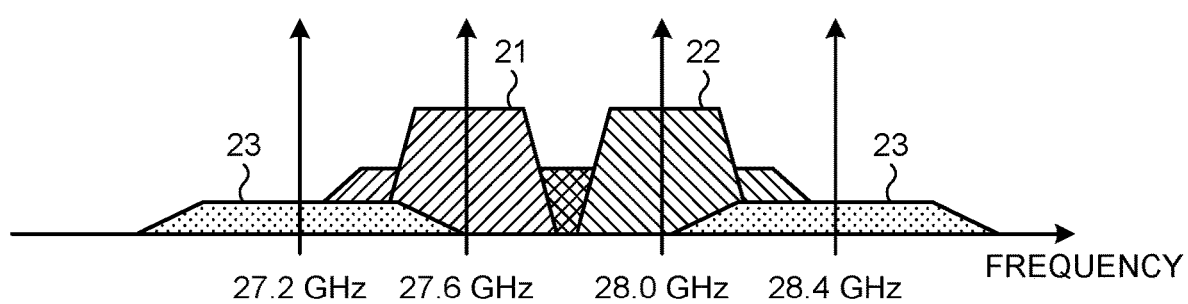

In the above-described embodiment, after the beam forming weight is applied to the distortion compensation signal, the distortion compensation signal and the out-of-band compensation signal are synthesized. It is however possible to, after synthesizing a distortion compensation signal and an out-of-band compensation signal, apply a beam forming weight to a synthesized signal. FIG. 5 illustrates the configuration of the RU 100 in such a case. In FIG. 5, the same components as those in FIG. 2 are denoted with the same reference numerals and illustration of the D/As 141 to 144, the A/D 145, the up converters 151 to 154, and the down converter 155 is omitted.

As illustrated in FIG. 5, PSs 201 and 202 apply out-of-band weights corresponding to beam forming weights to an out-of-band compensation signal that compensates for out-of-band non-linear distortion of first-band data. PSs 203 and 204 apply out-of-band weights corresponding to beam forming weights to an out-of-band compensation signal that compensates for out-of-band non-linear distortion of second-band data.

Each of synthesizers 211 and 212 synthesizes a distortion compensation signal that compensates for in-band non-linear distortion of the first-band data and an out-of-band compensation signal that compensates for out-of-band non-linear distortion of the first-band data. Each of synthesizers 213 and 214 synthesizes a distortion compensation signal that compensates for in-band non-linear distortion of the second-band data and an out-of-band compensation signal that compensates for out-of-band non-linear distortion of the second-band data.

Each of PSs 221 to 224 applies a beam forming weight to the synthesized signal obtained by synthesizing the distortion compensation signal and the out-of-band compensation signal. In other words, the PS221 applies a beam forming weight $\varphi_{11}$, the PS222 applies a beam forming weight $\varphi_{12}$, the PS223 applies a beam forming weight $\varphi_{21}$, and the PS224 applies a beam forming weight $\varphi_{22}$. When such beam forming weights are applied, the PSs 201 to 204 described above respectively apply out-of-band weights $(\varphi_{11}-\varphi_{21})$, $(\varphi_{12}-\varphi_{22})$, $(\varphi_{21}-\varphi_{11})$ and $(\varphi_{22}-\varphi_{12})$ to the out-of-band compensation signals.

When the beam forming weights are applied to the synthesized signals, a synthesizer 231 synthesizes the signals to be amplified by the power amplifier 181 and a synthesizer 232 synthesizes the signals to be amplified by the power amplifier 182.

As described above, it is also possible to compensate for in-band and out-of-band non-linear distortion of the first-band data and the second-band data by synthesizing the distortion compensation signals and the out-of-band compensation signals before applying beam forming weights to distortion compensation signals and applying the beam forming weights to the synthesized signals.

In the above-described embodiment, it has been described that a compensation is made for third order distortion serving as out-of-band non-linear distortion of the first-band data and the second-band data; however, out-of-band non-linear distortion is not limited to third order distortion. For example, higher fifth order distortion or seventh order distortion may be suppressed using out-of-band compensation signals. In such a case, equations for calculating out-of-band compensation signals (Equations (3) and (4) above) and out-of-band weights are adjusted as appropriate according to the degree of non-linear distortion to be suppressed.

According to a mode of a radio communication device and a distortion compensation method disclosed by the present application, an effect that it is possible to compensate for non-linear distortion that occurs in a power amplifier that amplifies signals of a plurality of frequency bands different from each other is achieved.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio communication device comprising:
   a plurality of antenna elements;
   a phase shifter that applies weights for each of the antenna elements respectively to first-band data and second-band data of different frequency bands to form beams corresponding to the first-band data and the second-band data;
   a power amplifier that is arranged for each of the antenna elements and that amplifies the first-band data and the second-band data; and
   a processor configured to compensate for non-linear distortion that occurs in the first-band data and the second-band data in the power amplifier,
   wherein the processor executes a process including
   calculating, using a first distortion compensation coefficient, a distortion compensation signal that compensates for in-band non-linear distortion of the first-band data and the second-band data from the first-band data and the second-band data, and
   calculating, using a second distortion compensation coefficient, an out-of-band compensation signal that compensates for out-of-band non-linear distortion of the first-band data and the second-band data from the first-band data and the second-band data, and
   the power amplifier amplifies a signal obtained by synthesizing the distortion compensation signal and the out-of-band compensation signal.

2. The radio communication device according to claim 1, wherein the processor executes the process further including updating the first distortion compensation coefficient and the second distortion compensation coefficient based on a feedback signal that is fed back from the power amplifier, the first-band data, and the second-band data.

3. The radio communication device according to claim 2, wherein the updating includes
   performing phase conversion same as phase conversion by the phase shifter on the first-band data and the second-band data,
   calculating an error between a reference signal obtained by the phase conversion and the feedback signal,
   updating a base coefficient such that the calculated error becomes smaller, and
   calculating, based on the updated base coefficient, the first distortion compensation coefficient and the second distortion compensation coefficient.

4. The radio communication device according to claim 2, further comprising a switch that switches between signals that are output from the power amplifiers of the respective antenna elements at given intervals and feedbacks the signals to the processor.

5. The radio communication device according to claim 1, further comprising an out-of-band phase shifter that applies, to the out-of-band compensation signal, an out-of-band weight corresponding to a weight that is applied by the phase shifter to the distortion compensation signal.

6. The radio communication device according to claim 1, wherein the calculating the out-of-band compensation signal includes calculating the out-of-band compensation signal that compensates for out-of-band third order distortion of the first-band data and the second-band data.

7. A distortion compensation method that is executed by a radio communication device including a plurality of antenna elements; a phase shifter that applies weights for each of the antenna elements respectively to first-band data and second-band data of different frequency bands to form beams corresponding to the first-band data and the second-band data; and a power amplifier that is arranged for each of the antenna elements and that amplifies the first-band data and the second-band data, the method comprising:
- calculating, using a first distortion compensation coefficient, a distortion compensation signal that compensates for in-band non-linear distortion of the first-band data and the second-band data from the first-band data and the second-band data;
- calculating, using a second distortion compensation coefficient, an out-of-band compensation signal that compensates for out-of-band non-linear distortion of the first-band data and the second-band data from the first-band data and the second-band data;
- synthesizing the distortion compensation signal and the out-of-band compensation signal; and
- amplifying, using the power amplifier of each of the antenna elements, a signal obtained by the synthesizing.

* * * * *